United States Patent
Schechter et al.

(10) Patent No.: US 8,930,469 B2
(45) Date of Patent: Jan. 6, 2015

(54) FUNCTIONALITY FOR SHARING ITEMS USING RECIPIENT-SPECIFIC ACCESS CODES

(75) Inventors: Stuart E. Schechter, Kirkland, WA (US); Kami E. Vaniea, Pittsburgh, PA (US); Alain Forget, Ottawa (CA)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 13/019,314

(22) Filed: Feb. 2, 2011

(65) Prior Publication Data

US 2012/0198003 A1     Aug. 2, 2012

(51) Int. Cl.
G06F 15/16 (2006.01)
G06Q 10/10 (2012.01)
H04L 12/58 (2006.01)

(52) U.S. Cl.
CPC .............. *G06Q 10/101* (2013.01); *H04L 51/34* (2013.01); *H04L 51/08* (2013.01); *G06Q 10/107* (2013.01)
USPC ............................ 709/206; 709/207; 709/203

(58) Field of Classification Search
CPC ...... H04L 12/58; H04L 12/583; H04L 51/063
USPC ........................................................ 709/206
See application file for complete search history.

(56) References Cited

U.S. PATENT DOCUMENTS

| | | | |
|---|---|---|---|
| 6,973,455 B1 | 12/2005 | Vahalia et al. | |
| 7,475,139 B2 | 1/2009 | Goodman et al. | |
| 7,664,824 B2 * | 2/2010 | Kobayashi et al. | 709/217 |
| 7,831,676 B1 * | 11/2010 | Nagar | 709/206 |
| 2002/0104021 A1 | 8/2002 | Gross | |
| 2004/0186894 A1 | 9/2004 | Jhingan et al. | |
| 2005/0108336 A1 * | 5/2005 | Naick et al. | 709/206 |
| 2005/0240773 A1 | 10/2005 | Hilbert et al. | |
| 2006/0036697 A1 * | 2/2006 | Lin et al. | 709/206 |
| 2006/0123008 A1 | 6/2006 | Stillion et al. | |
| 2007/0106736 A1 * | 5/2007 | Shepherd | 709/206 |
| 2010/0325229 A1 * | 12/2010 | Kelley | 709/206 |

OTHER PUBLICATIONS

Miltchev, et al., "Decentralized Access Control in Distributed File Systems," retrieved at <<http://www.cs.columbia.edu/~angelos/Papers/2008/dfs_survey.pdf>>, ACM Computing Surveys, vol. 40, No. 3, Aug. 2008, 32 pages.

(Continued)

*Primary Examiner* — Hua Fan
(74) *Attorney, Agent, or Firm* — Heikki Einola; Judy Yee; Micky Minhas (57) ABSTRACT

A collaboration system is described for sharing files. The collaboration system operates by receiving an Email message from a sender, the Email message specifying an attachment item (such as a file) and one or more recipients. The Email message also specifies a sender code assigned to the sender for the particular attachment item. The collaboration system stores the attachment item and then generates a recipient-specific code associated with each recipient who is to receive the Email message. The collaboration system then sends a recipient-tailored Email message to each recipient. Each recipient-tailored Email message contains Email content provided by the original Email message along with a recipient-specific code associated with the recipient. Each recipient can access the attachment item via its recipient-specific code, which constitutes a secure access key.

20 Claims, 9 Drawing Sheets

(56) References Cited

OTHER PUBLICATIONS

"File and Folder Permissions," retrieved at <<http://technet.microsoft.com/en-us/library/cc732880.aspx>>, Microsoft TechNet, Windows Server TechCenter, Microsoft Corporation, Redmond, WA, retrieved on Feb. 1, 2011, 2 pages.

Povey, Dean, "Optimistic Security: A New Access Control Paradigm," retrieved at <<http://acm.org>>, Proceedings of the 1999 Workshop on New Security Paradigms, 1999, pp. 40-45.

Saltzer, et al., "The Protection of Information in Computer Systems," retrieved at <<http://www.ece.cmu.edu/~adrian/630-f05/readings/saltzer-schroeder-protection_information.pdf>>, Communications of the ACM, 17(7), Jul. 1974, 30 pages.

"User permissions and permission levels (SharePoint Foundation 2010)," retrieved at <<http://technet.microsoft.com/en-us/library/cc288074.aspx>>, Microsoft TechNet, SharePoint Products, Microsoft Corporation, Redmond, WA, Jan. 7, 2011, 6 pages.

"Tools: Revision History," retrieved at <<http://docs.google.com/support/bin/answer.py?hl=en&answer=190843>>, Google Docs, Doc Help, Google Inc., Mountain View, CA, retrieved on Feb. 1, 2011, 2 pages.

"Mac OS X Server, File Server Administration, Version 10.6 Snow Leopard," retrieved at <<http://manuals.info.apple.com/en_US/FileServerAdmin_v10.6.pdf>>, Apple Inc., Cupertino, CA, 2009, 158 pages.

"Network File System (protocol)," retrieved at <<http://en.wikipedia.org/wiki/Server_Message_Block)>>, Wikipedia entry, retrieved on Feb. 1, 2011, 6 pages.

"Server Message Block," retrieved at <<http://en.wikipedia.org/wiki/Network_File_System_(protocol)>>, Wikipedia entry, retrieved on Feb. 1, 2011, 9 pages.

"Andrew File System," retrieved at <<http://en.wikipedia.org/wiki/Andrew_File_System>>, Wikipedia entry, retrieved on Feb. 2, 2011, 3 pages.

"Cloud storage," retrieved at <<http://en.wikipedia.org/wiki/Cloud_storage>>, Wikipedia entry, retrieved on Feb. 2, 2011, 2 pages.

"Content management system," retrieved at <<http://en.wikipedia.org/wiki/Content_management_system>>, Wikipedia entry, retrieved on Feb. 2, 2011, 2 pages.

"Cloud Storage Providers," retrieved at <<http://www.ezdia.com/epad/cloud-storage-providers-mozy-boxnet-dropbox/5584/>>, eZdia, Jan. 11, 2011, retrieved on Feb. 2, 2011, 5 pages.

* cited by examiner

FUNCTIONALITY FOR SHARING ITEMS USING RECIPIENT-SPECIFIC ACCESS CODES

BACKGROUND

A user may rely on a variety of techniques to share an item (such as a file) with other users. In one approach, for instance, the user may attach an item to an Email message. The user may then forward the Email message to the other users. If any user makes a change to the item, that user may manually forward the updated item to the other users via another Email message.

In another technique, a user may upload the item to file sharing functionality that is accessible to individuals within an organization. One such file sharing functionality is Share-Point®, provided by Microsoft Corporation of Redmond, Wash. The user may also expressly specify permission information which defines the respective rights of users to access and modify the item. In addition, the file sharing functionality may require users to authenticate themselves prior to interacting with the file sharing functionality, e.g., by submitting respective user names and passwords.

Each technique for sharing items has its respective strengths and weaknesses. As such, in the context of certain environments, no single technique offers a wholly satisfactory solution.

SUMMARY

A collaboration system is described for sharing items (such as files), referred to attachment items herein. In one implementation, the collaboration system operates by receiving an original Email message from a sender. The original Email message includes an attachment item and specifies one or more recipients. The Email message is also associated with a sender code assigned to the sender for the particular attachment item to be shared. After receiving the original Email message, the collaboration system stores the attachment item and then generates a recipient-specific code for each recipient who is to receive the attachment item. The collaboration system then sends a recipient-tailored Email message to each recipient. Each recipient-tailored Email message contains Email content provided by the original Email message along with a recipient-specific code associated with the respective recipient. As such, each recipient appears to receive the same Email message, but with a different respective recipient-specific code from other recipients.

According to another illustrative feature, the codes generated for the sender and recipient(s) are unique codes assigned to those respective individuals. Further, the codes may have high entropy, allowing the codes to function as secure access keys.

According to another illustrative feature, an Email server module may perform the above-described receiving of the original Email message and sending of the recipient-tailored Email message(s). A file server module may perform the above-described storing of the attachment item and generating of the recipient-specific code(s).

According to another illustrative feature, a recipient who receives a recipient-tailored Email message can click on a link that provides the recipient-specific code. In response, the collaboration system provides access to the attachment item. The collaboration system can determine the user who has requested access to the attachment item based on the particular recipient-related code that is being used to access the attachment item.

According to another illustrative feature, a recipient may also modify the attachment item. In response, the collaboration system can store a new version of the attachment item, associated with the user who made the modification. Subsequently, the collaboration system may allow any user (who has access to a sender code or any recipient-specific code) to access any version of the attachment item.

According to another illustrative feature, the collaboration system can store audit information regarding users who have accessed or modified the attachment item.

According to another illustrative feature, the collaboration system can allow any recipient user to forward a recipient-tailored message to a new recipient. In response, the collaboration system can operate in the manner described above. That is, in certain circumstances described in the Detailed Description, the collaboration system can generate a new recipient-specific code for the new recipient and then send a recipient-tailored Email message to the new recipient that contains at least the new recipient-specific code.

The collaboration system offers various potential benefits when applied to some environments. For example, the collaboration system allows an original sender to accomplish multiple file distribution tasks in a convenient manner by simply attaching the attachment item to an Email message and sending the Email message to the intended recipient(s). For instance, this operation prompts the collaboration system to store the attachment item at an accessible location, define the recipients who are authorized to access the attachment item, define the permissions of the authorized recipients, and distribute recipient-specific codes to the authorized recipients.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure describes an illustrative collaboration system for sharing an attachment item (e.g., a file) among users.

Figure 9:
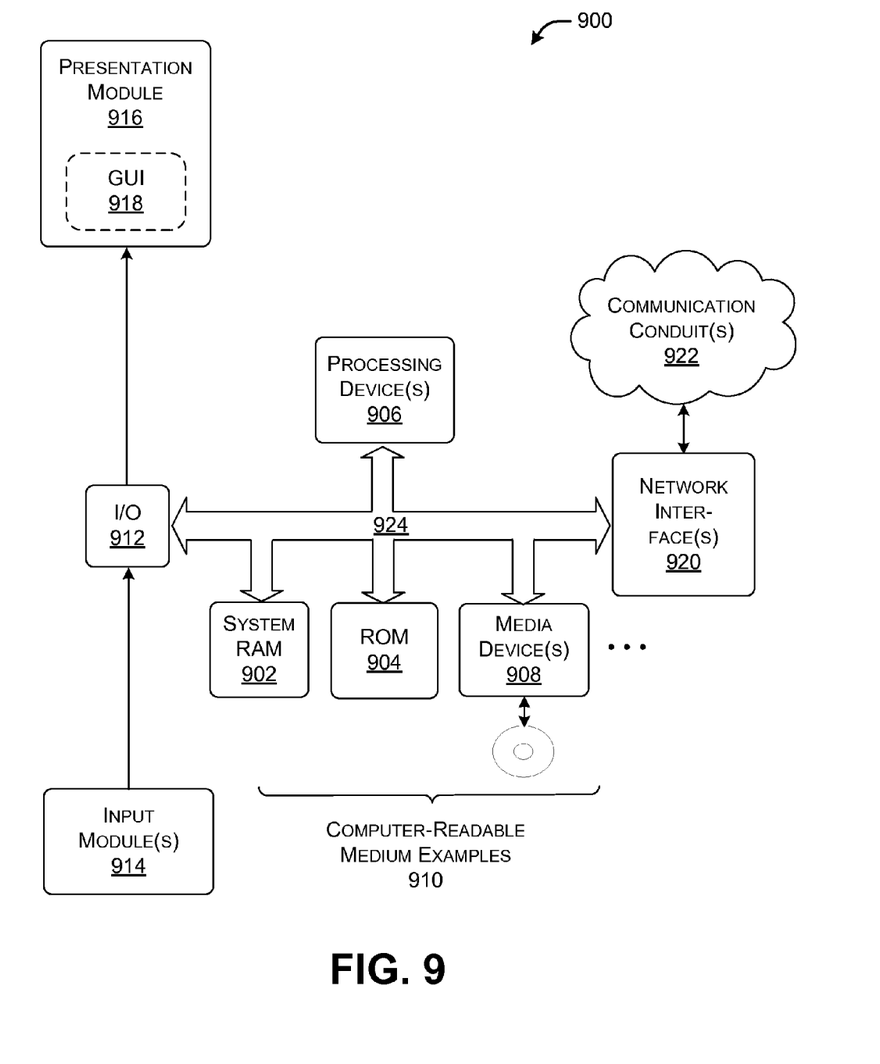
FIG. 9 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 9, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

Figure 1:
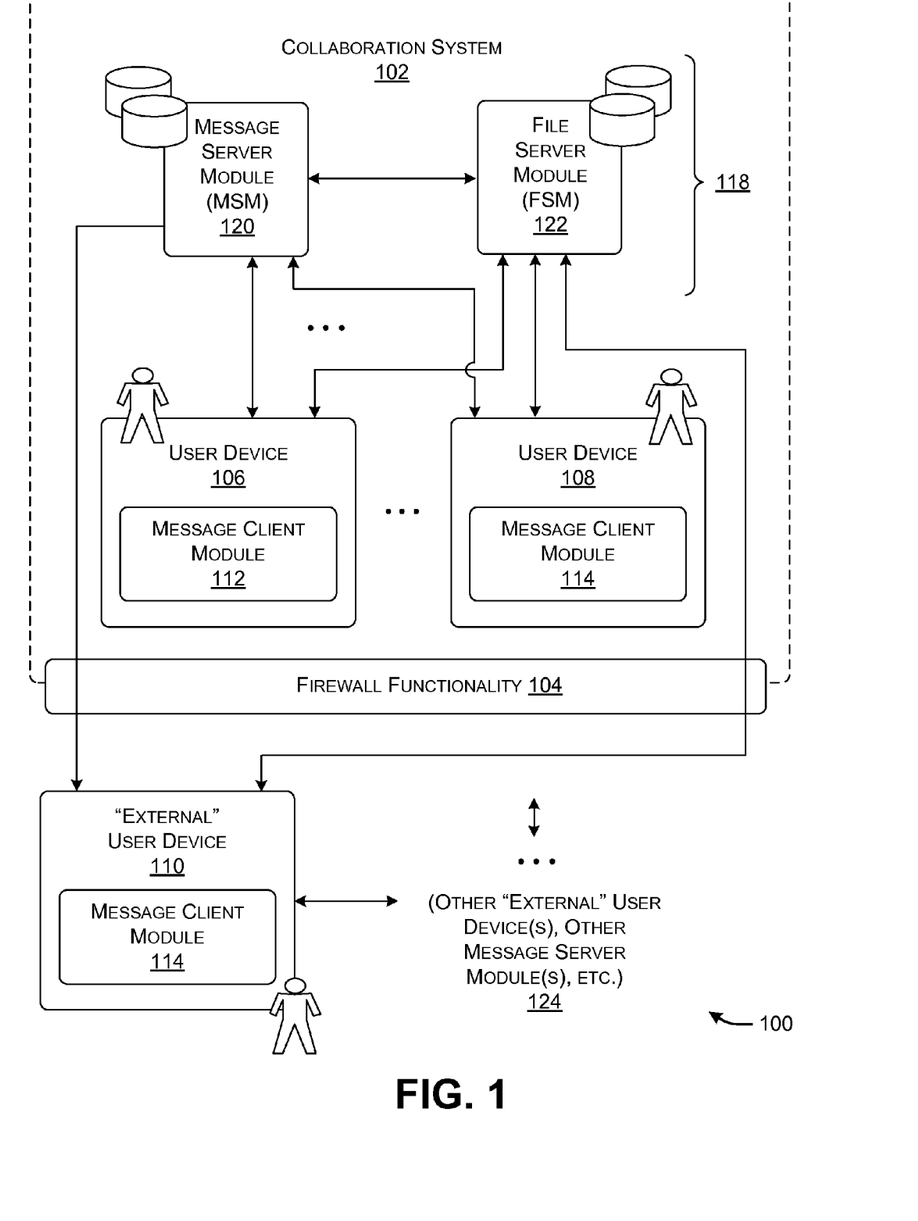
FIG. 1 shows an illustrative collaboration system for sharing attachment items among users.

Beginning with FIG. 1, this figure shows an illustrative environment 100 in which users may share attachment items with other users for any reason. As used herein, an attachment item may refer to any unit of content of any nature, such as a text document, a spreadsheet, a picture, an audio file, a video, a markup (e.g., XML) document, etc., or any combination thereof. In the examples which follow, it will be assumed that a user interacts with the environment 100 to share a single attachment item with one or more other users. However, in other scenarios, a user can simultaneously share two or more attachment items.

The environment 100 may rely on a collaboration system 102 to share attachment items. In one case, the collaboration system 102 may correspond to functionality for exchanging attachment items between members of an organization, such as a company, an academic institution, a government agency, and so on. The collaboration system 102 has a domain which refers to its scope of control. FIG. 1 denotes the domain associated with the collaboration system 102 by a dashed-line box.

According to the terminology used herein, any user who sends an attachment item to another user is referred to as a sender. The sender may correspond to an original sender, representing a person who sends the attachment item for the first time to one or more other users. Or the sender may correspond to a person who forwards an attachment item which the sender, in turn, has received from another person. A user who receives an attachment item is referred to as a recipient. More specifically, in the examples set forth below, the senders and receivers correspond to human participants. Alternatively, or in addition, any entity involved in the sharing of attachment items may correspond to a non-human agent, such as a functional module within any type of software system.

Further, users who exchange attachment items within the controlling context of the collaboration system 102 are referred to as internal users. In contrast, users who are outside the controlling context of the collaboration system 102 are referred to as external entities. The message collaboration-system 102 may provide firewall functionality 104 to prevent external entities from accessing and utilizing at least some functionality provided by the collaboration system 102. In other implementations, there is no distinction between internal and external users; here, all users may be considered as internal users insofar they all have the same entitlement to the use the collaboration system 102.

A user may operate a user device to send and receive attachment items. Any user device may correspond to a personal computer, a computer workstation device, a laptop computer device, a computer terminal device, a game console device, a set-top box device, a personal digital assistant device, a mobile telephone device, a tablet-type computer device, an electronic book-reader device, and so on. FIG. 1 particularly shows representative user devices 106 and 108 which are associated with the collaboration system 102, and therefore entitled to utilize all the functionality of the collaboration system 102. FIG. 1 shows a representative user device 110 which is external to the collaboration system 102, and therefore may not be entitled to interact with all of the functionality of the collaboration system 102. Generally, these user devices (106, 108, 110) represent only a small number of a larger collection of devices (not shown) that can interact with each other within the environment 100.

Each user device (or at least some user devices) may optionally include message client modules for exchanging messages with other user devices. For example, the user device 106 includes a message client module 112, the user device 108 includes a message client module 114, and the user device 110 includes a message client module 116. In an alternative implementation, at least some of the user devices (106, 108, 110) can omit locally-implemented message client modules, and instead use network-implemented (e.g., Web-implemented) message functionality.

By way of broad overview, the environment 100 allows users to share attachment items via messages sent among the user devices. For example, the environment 100 allows users to share attachment items using Email messages. In other cases, the environment 100 can share attachment items using other types of messages, such as instant messaging (IM) messages, Twitter-based messages (provided by Twitter Inc. of San Francisco, Calif.), messages sent via a social networking site (such as Facebook, provided by Facebook Inc. of Palo Alto, Calif.), and so on, or any combination thereof. To simplify the explanation below, however, it will be assumed that the environment 100 exchanges attachment items via Email messages. In this context, the message client modules (112, 114, 116) correspond to Email client modules.

The collaboration system 102 may incorporate any type of processing functionality 118 for exchanging messages and attachment items among users. For example, in one case, the processing functionality 118 can include a message server module 120 in conjunction with a file server module 122. The message server module 120 can correspond to functionality for handling the exchange of messages among users operating respective user devices. In one implementation, the message sever module 120 can be implemented, in part, based on functionality provided by Microsoft® Exchange Server, provided by Microsoft Corporation of Redmond, Wash. More generally, the exchange of Email messages may be governed by any protocol or combination of protocols, such as the Simple Mail Transfer Protocol (SMTP). The file server module 122 can correspond to functionality for handling the storage and retrieval of attachment items (among other tasks to be set forth below).

In one case, the message server module 120 may represent functionality that is centralized at a specified location. In another implementation, the message server module 120 may represent functionality that is distributed over plural locations. That functionality may correspond to one or more computer servers, associated data stores, etc. Similarly, the file server module 122 may represent functionality that is centralized or distributed. That functionality may correspond to one or more computer servers, associated data stores, etc.

Although not shown, any type of coupling mechanism(s) can be used to connect together the different components of the collaboration system 102, including the message server module 120, the file server module 122, and the user devices (106, 108). Similarly, any type of coupling mechanism(s) can be used to connect the components of the collaboration system 102 with external user devices (e.g., user device 110). The coupling mechanisms can include one or more local area networks, one or more wide area networks (e.g., the Internet), one or more peer-to-peer-type networks, one or more point-to-point connections, and so on, or any combination thereof.

Finally, FIG. 1 includes a note 124 which indicates that the environment 100 may include other features, such as additional external user devices, additional Email server modules, etc. For example, other collaboration systems (not shown) may employ other Email server modules and/or file server modules. The collaboration system 102 can interact with these external components to transfer Email messages outside the domain of the collaboration system 102.

In some implementations, external users (who operate external user devices) may have limited ability to interact with the processing functionality 118 of the collaboration system 102. For example, in some implementations, the collaboration system 102 may lack means to authenticate an external user, other than by proving that such a user received an Email message. Further, in some implementations, the collaboration system 102 may not be involved in the processing of an Email message sent by an external user; rather, such an Email message may be processed by one or more external Email server modules that are potentially not compliant with the collaboration system 102.

FIGS. 2-5 set forth an example which illustrates one manner of operation of the environment 100 shown in FIG. 1 according to one use scenario. By way of overview, in this example, an original sender sends a message that enables two recipients (recipient A and recipient B) to access a single attachment item, such as a file of any type. Both recipient A and recipient B are members of an organization (e.g., a company) associated with the collaboration system 102. Upon receipt of the message, recipient B then accesses and modifies the attachment item. Recipient A, on the other hand, forwards the message to a recipient X, which entitles that recipient to access the attachment item. More specifically, in these examples, the sharing of the attachment item is made possible through the sending and receiving of Email messages. However, as stated above, the principles set forth herein can also be implemented by exchanging other types of messages.

FIGS. 2-5 represent discrete actions by respective numbers, e.g., (1), (2), (3), etc. Further, these figures identify the particular agent which performs each action. That is, each row of these figures is associated with a particular agent; a number that appears in a row identifies an operation that is performed by the agent which is associated with the row. But this example is representative of one of many ways that the functions described herein can be performed. In other cases, the order in which actions are performed can be varied in any manner (including the case in which two or more actions are performed in a parallel manner). Alternatively, or in addition, the agents which perform the actions can be varied in any manner (including the case in which two or more agents cooperatively perform an action).

Figure 2:
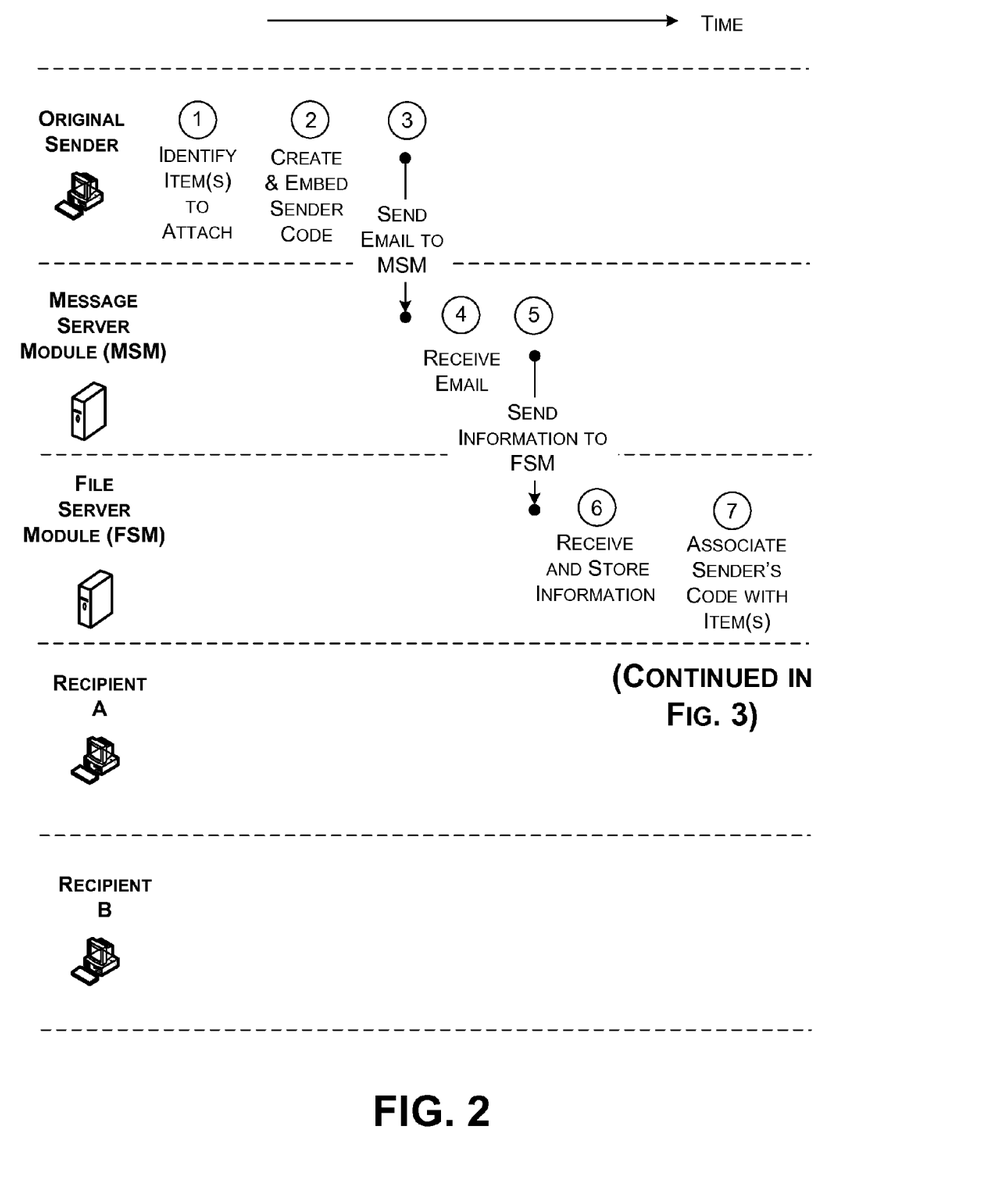
FIGS. 2-5 collectively depict a flow diagram that shows one manner of operation of the collaboration system of FIG. 1, in one illustrative scenario.

Beginning with action (1) of FIG. 2, the original sender associates an attachment item with an Email message. This Email message is referred to herein as an original Email message, indicating that is generated by the original sender. The original sender can perform this operation in any manner. For example, presume that the original sender is interacting with an Email client module having an Email client interface. More specifically, assume that the original sender is the process of creating the original Email message to be sent to recipient A and recipient B using the Email client interface. In one attachment technique, the original sender can drag an icon associated with the attachment item onto the Email client interface. Or the original sender can activate an attachment mechanism via a toolbar provided by the Email client interface (if it is equipped with this functionality), and then manually identify the attachment item to be associated with the original Email message.

In action (2), the Email client module can automatically create a sender code associated with the original sender, for the particular attachment item that was attached in the first operation (1). For example, in one case, the Email client module can generate a random alphanumeric code or pseudo-random alphanumeric code that is associated with the original sender and the attachment item. The Email client module can then construct a link, referred to herein as a sender link. The sender link provides a location identifier (such as a uniform resource location (URL) identifier) that can be subsequently used by the original sender to access the attachment item. The sender link can include various fields of metadata, including the sender code associated with the original sender and the attachment item. The Email client module can then associate the sender link with the original Email message. For example, the Email client module can attach the sender link to the end of whatever Email message content is conveyed by the original Email message.

In an alternative implementation, the message server module 120 in FIG. 1 (e.g., an Email server module) can be used to perform one or more of the tasks described above. For example, the message server module 120 can generate the sender code and sender link upon receipt of the original Email message.

In operation (3), the Email client module sends the original Email message to the message server module 120. In operation (4), the message server module 120 receives the original Email message. Along with the message content, the original Email message specifies the original sender, the recipients of the original Email message (namely, recipient A and recipient B), and the sender code that is contained in the sender link.

In operation (5), the message server module 120 sends information extracted from the original Email message to the file server module 122. For example, the message server module 120 can send the attachment item to the file server module 122, along with an indication of the original sender and the two recipients. To perform this task, the message server module 120 can parse the original Email message, expand any distribution lists specified in original Email message, and so on.

In operation (6), the file server module 122 can store the attachment item in a data store so that it can be later be accessed by the recipients (and the original sender). The file server module 122 can also store information which associates the original sender with the attachment item. This pairing information enables the original sender to later access the attachment item.

Figure 3:
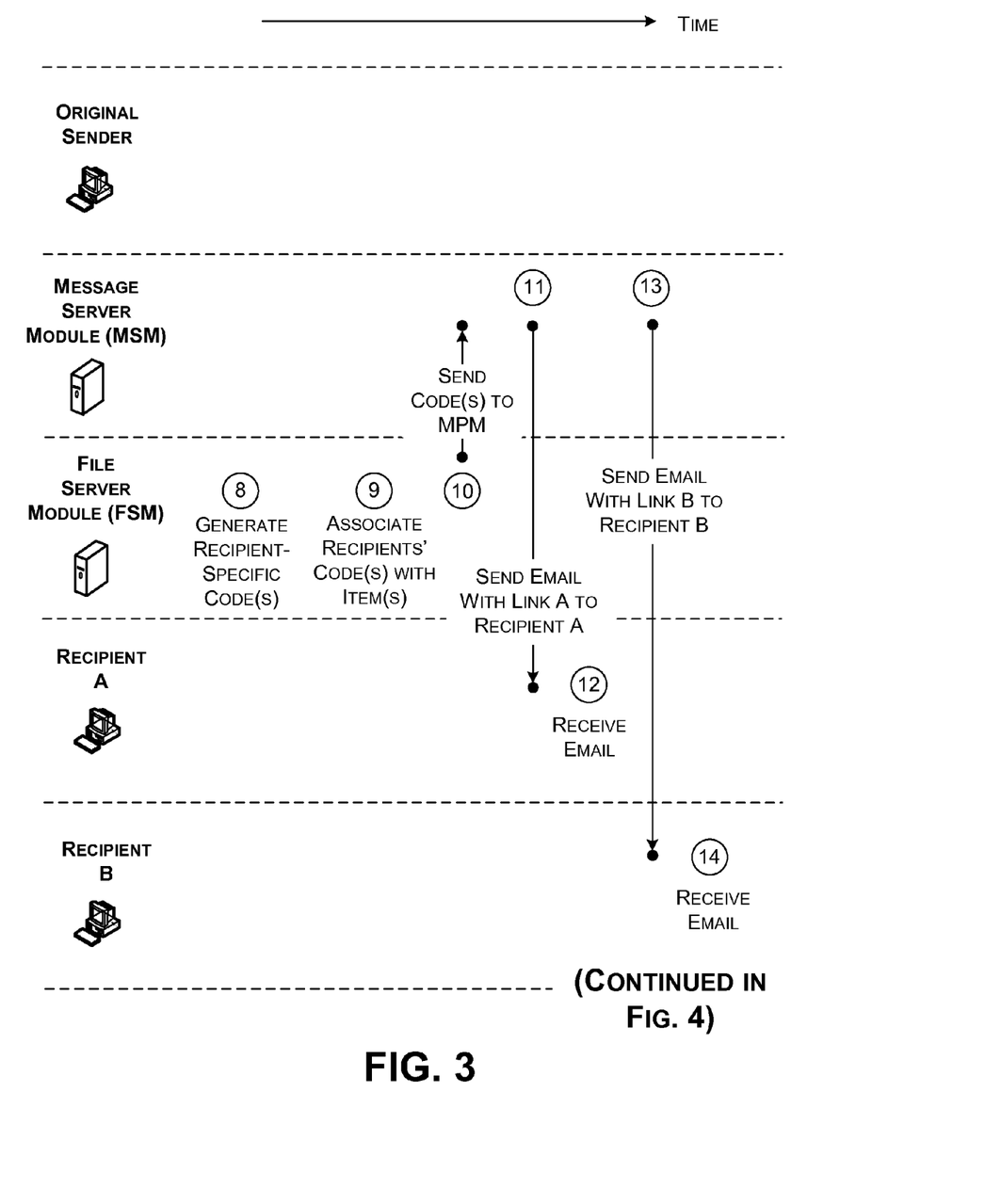

Advancing to FIG. 3, in operation (8), the file server module 122 generates two recipient-specific codes for recipient A and recipient B, respectively. For example, in one case, the file server module 122 can generate a random alphanumeric code or pseudo-random alphanumeric code for each recipient (in association with a particular attachment item). In operation (9), the file server module 122 can associate each recipient-specific code with the attachment item; more specifically, in this particular implementation, each recipient-specific code identifies both a recipient and a particular attachment item. This will later enable recipient A to access the attachment item using its recipient-specific code and recipient B to access the attachment item using its recipient-specific code. In operation (10), the file server module 122 sends the recipient-specific codes back to the message server module 120. In an alternative implementation, the message server module 120 can generate the recipient-specific codes itself, thus eliminating the operation whereby codes are transferred from the file server module 122 to the message server module 120.

In operation (11), the message server module 120 creates a recipient-tailored Email message for distribution to recipient A. The recipient-tailored email message contains the same Email content as the original Email message, but replaces the sender link with a recipient link (e.g., a URL) that contains the recipient-specific code for recipient A. It then sends this recipient-tailored Email message to recipient A. In operation (12), the recipient A receives the recipient-tailored Email message.

Similarly, in operation (13), the message server module 120 creates a recipient-tailored Email message for distribution to recipient B. This recipient-tailored Email message contains the same Email content as the original Email message, but replaces the sender link with a recipient link (e.g., a URL) that contains the recipient-specific code for recipient B. It then sends this recipient-tailored message to recipient B. In operation (14), the recipient B receives the recipient-tailored Email message. This example is distributed in time merely to facilitate explanation; in other implementations, the message server module 120 can send the recipient-tailored Email messages to both recipient A and recipient B at the same time or approximately at the same time.

In one implementation, the codes associated with the sender and recipients are unique codes that have high entropy. This makes the codes difficult to discover (e.g., guess) by non-authorized entities. As such, the codes are strong enough to function as secure individual-specific (e.g., unique) access keys.

In the above-described implementation, the environment 100 assigns a single code to each collaborating individual (e.g., to each of the sender and the two recipients). For each individual, the code identifies both the individual and the particular attachment item. An individual can subsequently retrieve the attachment item by presenting its assigned single code. In other implementations, the environment 100 can assign two or more codes to each individual. For example, the environment 100 can assign a recipient-specific code to a recipient that acts to identify the recipient. The environment 100 can also assign an item code to the recipient that identifies the attachment item. The recipient can then subsequently access the attachment item by presenting both the recipient-specific code and the item code. In one case, the item code is specific to each individual who receives that code; in another case, the item code is the same for all the collaborating individuals. To facilitate description, the following explanation describes the assignment of a single code to each collaborating individual; but any mention of the assignment of a single access code is to be interpreted as potentially encompassing the assignment of more than one access code.

Figure 4:
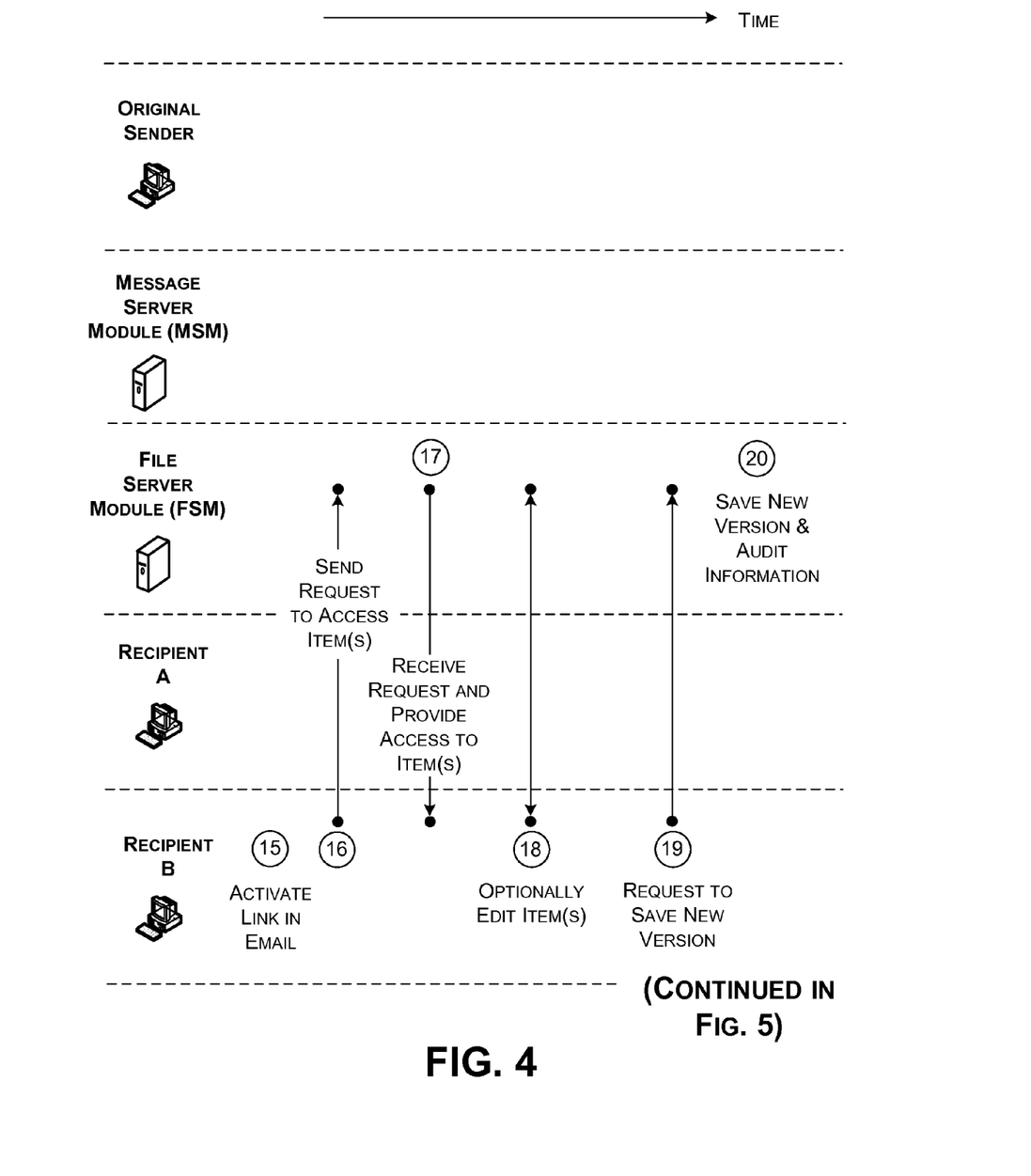

Advancing to FIG. 4, now assume that recipient B wishes to access and modify the attachment item. In operation (15), the recipient B begins by accessing the recipient-tailored Email message that it has received and clicking on (or otherwise activating) the recipient link in that message. In operation (16), recipient B's action prompts the Email client module to send a request to the file server module 122 to access the attachment item. Any protocol or combination of protocols can be used to implement this behavior, such as, but not limited to, the Web-based Distributed Authoring and Versioning (WebDAV) protocol (defined in RFC 4918), etc. Also, as shown in FIG. 1, the file server module 122 is accessible to both internal entities (who are members of an organization or other domain that hosts the collaboration system 102) and external entities (who are not associated with the organization or domain that hosts the collaboration system 102).

In operation (17), the file server module 122 can provide an interface which allows the recipient B to access the attachment item. For example, in one implementation, the file server module 122 can provide a user interface presentation which provides a pointer to each version of the attachment item that is currently available. At this time, assume that there is only a single pointer that identifies a single version provided by the original sender. The recipient B can activate this pointer to open the attachment item. The file server module 122 is able to determine which user is accessing the attachment item because this attachment item is being accessed using a recipient-specific code associated with a particular recipient. In this case, this enables the file server module 122 to store audit information which indicates that recipient B has accessed the attachment item (or some other entity has accessed the attachment item using the recipient-specific code associated with recipient B, as will be clarified below).

In operation (18), assume that the recipient B modifies the attachment item, such as by making changes to text associated with the attachment item. In operation (19), next assume that the recipient B makes a request to store the changes that he or she has made. In response, in operation (20), the file server module 122 stores a new version of the attachment item that contains the recipient's changes. More specifically, the file server module 122 can associate the new version with recipient B, since this version was created from a person using the recipient link associated with recipient B.

In one implementation, the file sever module 122 can retain all versions of an attachment item. An author who has created a particular version may be given the authority to delete his or her version; other users cannot delete that version. This protocol, however, can be varied in any way to suit the characteristics and objectives of a particular environment.

Figure 5:
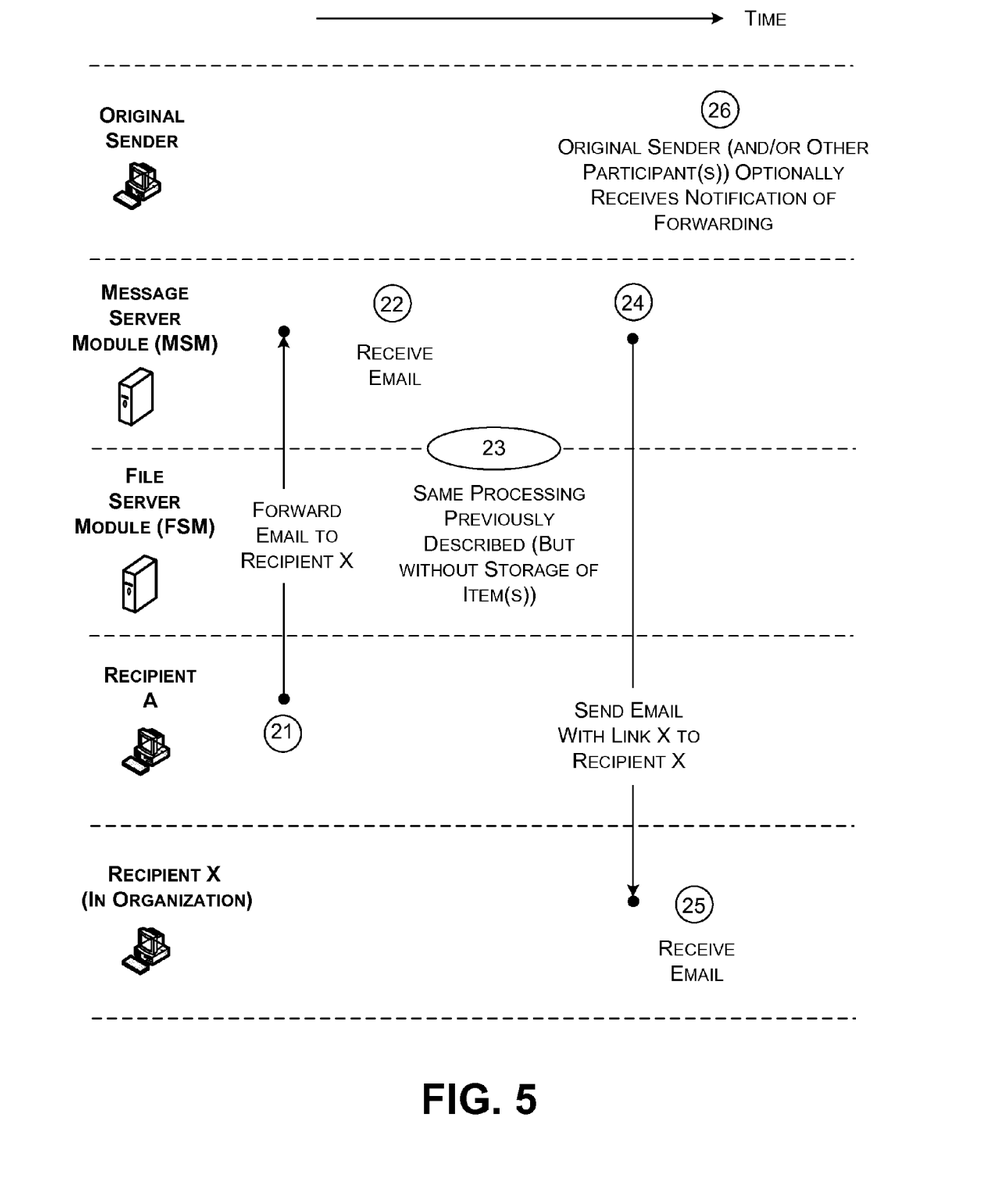

Advancing to FIG. 5, now assume that recipient A wishes to enable a new recipient (recipient X) to access and interact with the attachment item. Assume that recipient X is also associated with the collaboration system 102. For example recipient X may represent another member of the same company that employs recipient A. In operation (21), recipient A begins by using its Email client module to forward its recipient-tailored Email to recipient X. To do so, the Email client module sends the forwarded Email message to the message server module 120. In operation (22), the message server module 120 receives the forwarded Email message. More specifically, the recipient A can forward its recipient-tailored Email message to recipient X with or without modification. In the former case, the recipient A can make any changes to the body of its recipient-tailored Email message, including adding content, changing content, deleting some content, or deleting all content.

Operation (23) generally indicates that the message sever module 120 and the file server module 122 next cooperate to generate a new recipient-specific code for recipient X. This operation can proceed using the same protocol described above in the context of FIGS. 2 and 3. Note that this operation is performed if the recipient X does not already have a recipient-specific code. If the recipient X already has a code, the protocol can re-use the existing code without generating a new code.

In operation (24), the message server module 120 then sends a recipient-tailored message to recipient X. The recipient-tailored message contains a recipient link which contains at least the recipient-specific code for recipient X. In operation (25), the recipient X receives the recipient-tailored Email message.

Operation (26) indicates that the original sender (and/or recipient B) may optionally receive a notification which indicates that recipient A has forwarded its recipient-tailored Email message to recipient X. Different agents can be used to send this notification. In one case, the message server module 120 sends this notification. In another case, the Email client module of recipient A sends this notification. Although not shown, the collaboration system 102 can send a similar type of notification in the context of FIG. 4, to notify users that someone has modified an attachment item. In one case, the processing functionality 118 can receive configuration information from a creator of a version that specifies what notifications are to be sent in response to later operations performed on that version, e.g., in response to specified triggering events. Alternatively, or in addition, the processing functionality 118 can receive configuration information that governs the sending of notifications to users based on more general (e.g., version-agnostic) rules, etc.

Recipient X can also forward its recipient-tailored Email message to yet another recipient (or recipients). In this case, the collaboration system 102 repeats the operations described above to forward the Email message yet again. This forwarding and code-generating behavior can be repeated any number of times.

Although not shown, recipient A can also forward its recipient-tailored Email message to an entity that is external to the collaboration system 102. Further assume that this external entity next attempts to forward the recipient-tailored Email message to yet another recipient that is external to the collaboration system. In one implementation, the message server module 120 may not play a role in this last-mentioned forwarding operation. This further means that the recipient-tailored Email message will be forwarded without the assignment of a new recipient-specific code for the new recipient. In this case, the new recipient will receive the same recipient-tailored Email message that recipient A receives (or a modified version thereof), including the recipient link that is associated with recipient A. The new recipient can then access the attachment item using the recipient link associated with recipient A. The file server module 122 can store audit information which indicates that someone outside the domain of the collaboration system 102 is accessing the attachment item using the code associated with recipient A. The collaboration system 102 can also optionally send notifications to appropriate users in this circumstance.

The processing functionality 118 can optionally incorporate one or more additional provisions designed to enhance the security of the collaboration system 102 and/or achieve other objectives. In one case, the processing functionality 118 (or an originating Email client module) can encrypt the attachment item before it sends it to the recipients. The recipients can be provided, through a separate channel, with access keys to decrypt the attachment item.

Alternatively, or in addition, the processing functionality 118 can disable access to attachment items based on any environment specific factors. For example, the processing functionality 118 can disable access if the user device that is requesting access to the attachment item is outside the domain of the collaboration system 102. Alternatively, or in addition, the processing functionality 118 can disable access after a threshold number of Email messages have been sent that provide access to the attachment item, and so on. This will place limits on the number of times that users can forward the Email message that enables access to the attachment item.

Alternatively, or in addition, the processing functionality 118 and/or an Email client module can generate a warning message when the user attempts to forward an Email message (presuming that forwarding is not permitted). The processing functionality 118 and/or an Email client module can also optionally prevent the forwarding operation from proceeding if it is not permitted. The processing functionality 118 can be configured to perform this warning function on a per-version basis and/or on a more global (version-agnostic) basis. For example, in one case, a creator of a version can provide configuration information that controls what warnings are generated in response to later operations performed on the version, e.g., in response to specified triggering events.

Alternatively, or in addition, the processing functionality 118 can selectively disable access codes for recipients (and/or the original sender) for any environment-specific reasons, e.g., as controlled by the original sender, an administrator, etc. Alternatively, or in addition, the processing functionality 118 can automatically disable access codes after a predetermined amount of time.

Figure 6:
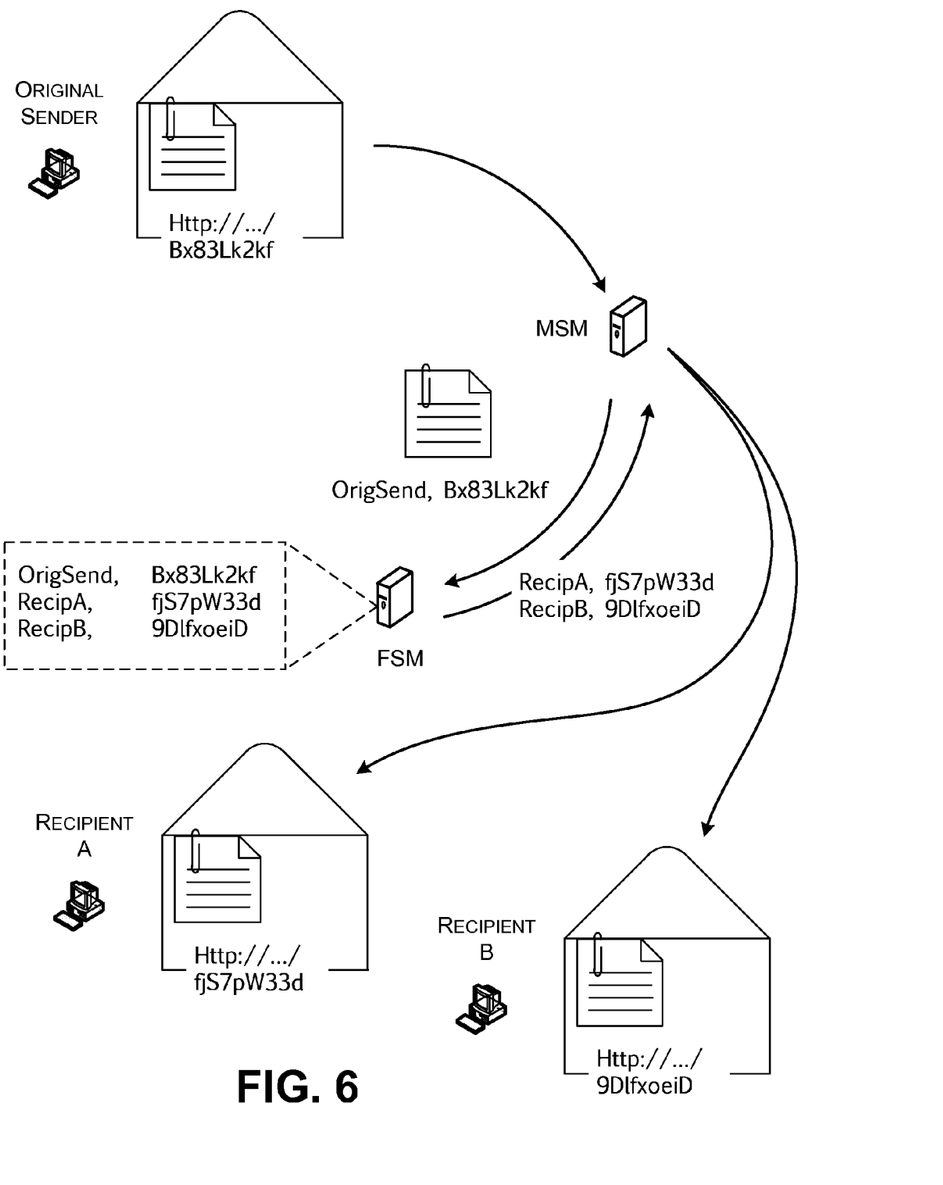
FIG. 6 is a summary of selected operations in the flow diagram of FIGS. 2-5.

FIG. 6 summarizes some of the operations set forth above in the context of FIGS. 2 and 3. As indicated there, the original sender uses his or her Email client module to attach a file to an Email message. The Email client module (or some other functionality) creates a sender link which contains a sender code. The message server module 120 receives the original Email message thus created. The message server module 120 parses the original Email message to extract the file; the message server module 120 also identifies the sender and the two recipients (recipient A and recipient B). The message server module 120 then sends this extracted information to the file server module 122.

The file server module 122 then stores the file. The file server module 122 also generates a recipient-specific code for recipient A and a recipient-specific code for recipient B. The file server module 122 also stores lookup information that includes the sender code and the two recipient-specific codes. The file server module 122 then forwards the recipient-specific codes back the message server module 120. As mentioned above, instead of assigning a single code to each user, the collaboration system 102 can assign two or more codes to each user.

Upon receipt, the message server module 120 uses the two recipient-specific codes to generate two recipient-tailored Email messages for recipient A and recipient B, respectively. The Email message tailored for recipient A has the same content as the original Email message, but includes a link containing the recipient-specific code for recipient A. Similarly, the Email message tailored for recipient B has the same content as the original Email message, but includes a link containing the recipient-specific code for recipient B.

Figure 7:
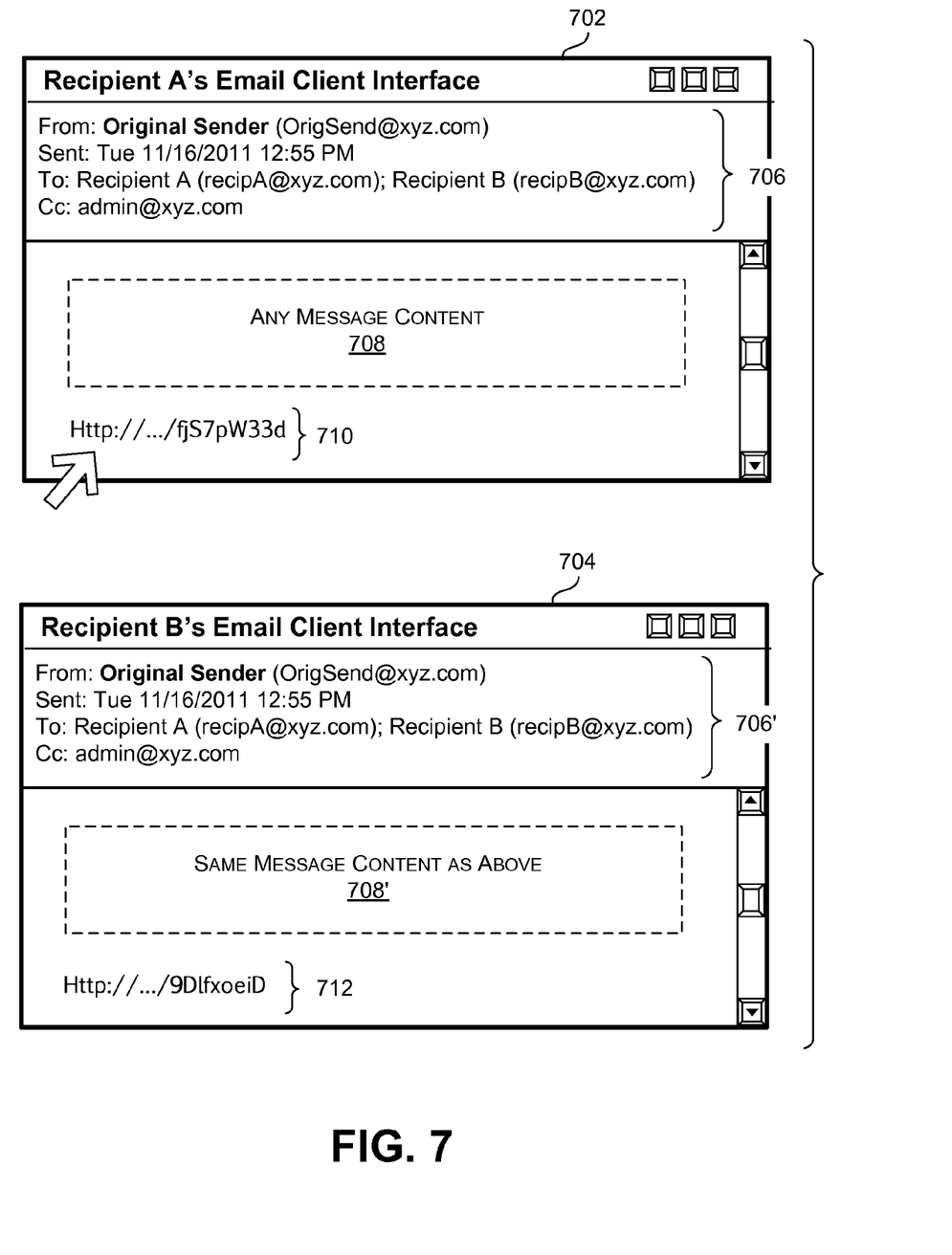
FIG. 7 shows illustrative Email client interfaces that are accessible to two recipients of recipient-tailored Email messages.

FIG. 7 shows an Email client interface 702 by which the Email client module, operated by recipient A, can access its recipient-tailored Email message. Similarly, FIG. 7 also shows an Email client interface 704 by which the Email client module, operated by recipient B, can access its recipient-tailored Email message. The Email message that appears in the Email client interface 702 includes a header portion 706 that is identical to a header portion 706' that appears in the Email client interface 704. Similarly, the Email message that appears in the Email client interface 702 includes a message content portion 708 that is identical to a message content portion 708' that appears in the Email client interface 704.

The recipient-tailored Email messages differ in the following manner. The recipient-tailored Email message for recipient A includes a recipient link 710 (e.g., a URL) that contains a recipient-specific code for recipient A, while the recipient-tailored Email message for recipient B includes a recipient link 712 (e.g., a URL) that contains a recipient-specific code for recipient B. Once again, instead of assigning a single code to each user, the collaboration system 102 can assign two or more codes to each user.

Figure 8:
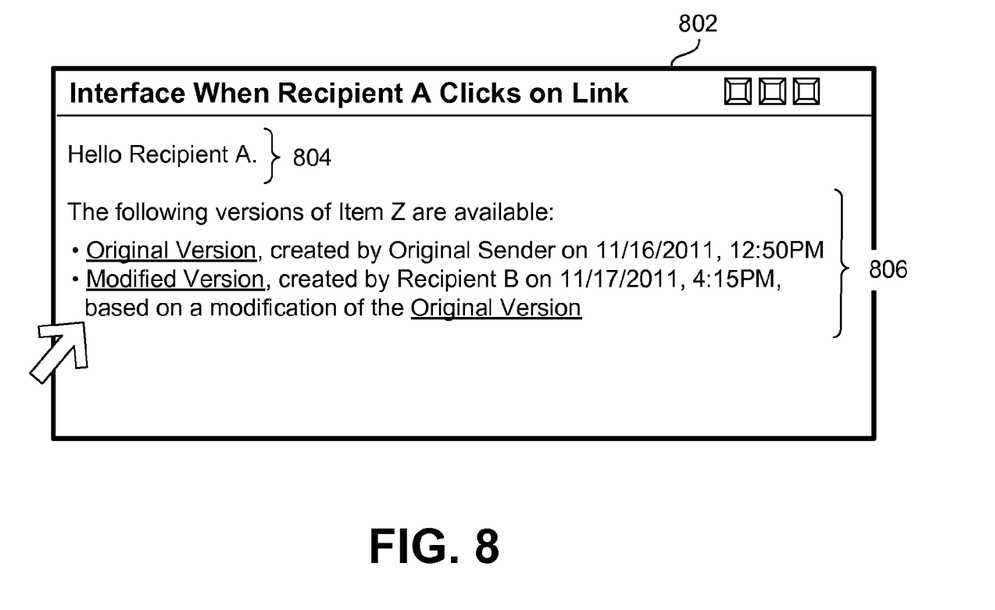
FIG. 8 shows an illustrative user interface presentation that may be produced when a recipient activates a recipient-specific code within a recipient-tailored Email message.

FIG. 8 shows one illustrative implementation of a user interface presentation 802 that the file server module 122 (or some other agent) may generate when recipient A clicks on the recipient link 710 shown in FIG. 7. The user interface presentation 802 can include a message 804 that is customized for recipient A. The file server module 122 knows that recipient A is the entity who is accessing the attachment item, since the link through which the entity seeks to access the attachment item is associated with recipient A. Alternatively, some other entity may be using recipient A's link to access the attachment item.

The user interface presentation 802 can also include information 806 which indicates the available versions of the attachment item. Assume, at this juncture, that recipient B has generated a modified version of the attachment item. Hence, the information 806 can reveal two versions of the attachment item. The first version corresponds to the original attachment item forwarded by the original sender. The second version corresponds to the modified version created by recipient B. The information 806 can also include pointers to the two versions. The information 806 can also provide any type of background information regarding each version, e.g., indicating who created the version, when the version was created, how the version was created, and so on. The recipient A can then select whatever version he or she desires. This also means that the recipient A can selectively ignore revisions for any environment-specific reasons, e.g., by clicking on the original version of the attachment item, rather than the version created by recipient B.

In the approach described above, the file server module 122 does not distinguish between read permissions and write permissions. Any user who receives a recipient link that contains a recipient-specific code can both read and modify an attachment item. Unwanted changes made to the attachment item can be selectively ignored by any user in the manner described above. However, the permission protocols used by the file server module 122 can also be varied in any manner, such as by assigning different types of permissions to different recipients and for different associated recipient-specific codes. In addition, or alternatively, the collaboration system 102 can assign new codes for each new version that is created. In that case, links that are created correspond to specific respective versions of the attachment item.

The different versions created by the users may form a hierarchical tree of versions. That is, any child node in that tree is associated with a child version that is a modification of a parent version associated with a parent node. Any child node, in turn, may have one or more of its own child nodes (and associated child versions). The tree thus defined may become complex in certain situations, having many versions. To address this issue, the file server module 122 can provide additional mechanisms for managing versions created by the collaborating users. For example, the file server module 122 can provide one or more filters for filtering the versions according to any filtering factors. The file sever module 122 can then selectively emphasize and/or de-emphasize versions in the user interface presentation 802 based on the outcome of its filtering. For example, the file server module 122 can selectively de-emphasize any version that does not correspond to a leaf node in the tree. The file server module 122 can also de-emphasize versions created by certain users and/or versions created under certain circumstances. Different implementations can adopt different environment-specific rules to govern the above-described filtering and selective-emphasizing/de-emphasizing behavior.

The collaboration system 102, when applied to certain environments, may offer various benefits. For instance, using the collaboration system 102, a user can accomplish multiple sharing-related tasks in a convenient manner by simply attaching an item to an Email message and then sending that Email message to one or more recipients. The tasks include: (1) storing the item at a location that is accessible to authorized recipients; (2) defining the authorized recipients; (3) assigning permissions for the authorized recipients; and (4) sending links with access codes that enable the recipients to access the attachment item.

Further, in one implementation, the collaboration system 102 does not require users to sign in or perform other authentication operations to send and receive items. This aspect may further simplify interaction with the collaboration system 102.

Further, in one implementation, the message server module 120 and the file server module 122 are administered by the trusted collaboration system 102, rather than a third party service provider. This may enhance the security of the collaboration system 102, e.g., because the trusted collaboration system 102 stores the versions, rather than a potentially untrustworthy third party. In addition, the trusted collaboration system 102 controls the audit information. In other implementations, however, aspects of the collaboration system 102 can be administered by one or more third party entities.

FIG. 9 sets forth illustrative electrical data processing functionality 900 (also referred to herein a computing functionality) that can be used to implement any aspect of the functions described above. For example, the processing functionality 900 can be used to implement any aspect of environment 100 shown in FIG. 1, such as any aspect of any user device, any aspect of the message server module 120, any aspect of the file server module 122, and so on. In one case, the processing functionality 900 may correspond to any type of computing device that includes one or more processing devices. In all cases, the electrical data processing functionality 900 represents one or more physical and tangible processing mechanisms.

The processing functionality 900 can include volatile and non-volatile memory, such as RAM 902 and ROM 904, as well as one or more processing devices 906 (e.g., one or more CPUs, and/or one or more GPUs, etc.). The processing functionality 900 also optionally includes various media devices 908, such as a hard disk module, an optical disk module, and so forth. The processing functionality 900 can perform various operations identified above when the processing device(s) 906 executes instructions that are maintained by memory (e.g., RAM 902, ROM 904, or elsewhere).

More generally, instructions and other information can be stored on any computer readable medium 910, including, but not limited to, static memory storage devices, magnetic storage devices, optical storage devices, and so on. The term computer readable medium also encompasses plural storage devices. In all cases, the computer readable medium 910 represents some form of physical and tangible entity.

The processing functionality 900 also includes an input/output module 912 for receiving various inputs (via input modules 914), and for providing various outputs (via output modules). One particular output mechanism may include a presentation module 916 and an associated graphical user interface (GUI) 918. The processing functionality 900 can also include one or more network interfaces 920 for exchanging data with other devices via one or more communication conduits 922. One or more communication buses 924 communicatively couple the above-described components together.

The communication conduit(s) 922 can be implemented in any manner, e.g., by a local area network, a wide area network (e.g., the Internet), etc., or any combination thereof. The communication conduit(s) 922 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by physical and tangible computing functionality, for sharing attachment items, comprising:
   receiving an original Email message from a sender, the original Email message specifying an attachment item and a plurality of recipients, the original Email message further being associated with a sender code assigned to the sender;
   storing the attachment item;
   generating a recipient-specific code for each of the recipients specified in the original Email message, wherein each recipient-specific code is an access key that enables each recipient to securely assess the attachment item, to modify the attachment item, and to store a specific version of the attachment item that corresponds to the recipient-specific code; and
   sending a plurality of recipient-tailored Email messages to the recipients specified in the original Email message, the recipient-tailored Email messages containing Email content provided by the original Email message along with the generated recipient-specific codes associated with the specified recipients.

2. The method of claim 1, further comprising:
   receiving a request by one of the recipients to forward the original email message to another recipient and generating another recipient-specific code associated with the other recipient.

3. The method of claim 1, wherein the recipient-specific codes are high-entropy codes that constitute recipient-specific access keys.

4. The method of claim 1, further comprising generating the sender code and associating the sender code with the original Email message.

5. The method of claim 4, wherein said generating of the sender code is performed by an Email client module operated by the sender.

6. The method of claim 4, wherein said generating of the sender code is performed by an Email server module.

7. The method of claim 1, wherein said receiving and sending are performed by an Email server module.

8. The method of claim 7, wherein said storing and generating are performed by a file server module.

9. The method of claim 8, wherein the file server module further performs operations of:
   associating the sender code with the attachment item; and
   associating the recipient-specific codes with the attachment item.

10. The method of claim 8, further comprising sending the recipient-specific codes to the Email server module.

11. The method of claim 1, further comprising:
    receiving a request by at least one of the recipients to access the attachment item in response to activation of the corresponding recipient-specific code; and
    enabling that recipient to access the attachment item.

12. The method of claim 1, further comprising:
    receiving a request by at least one of the recipients to store a modified version of the attachment item; and
    storing the modified version of the attachment item.

13. The method of claim 1, further comprising storing audit information regarding entities that have accessed or modified the attachment item.

14. The method of claim 2, further comprising
    sending another recipient-tailored Email message to the other recipient, the other recipient-tailored Email message containing at least the other recipient-specific code.

15. A storage device for storing computer readable instructions, the computer readable instructions providing a file server module when executed by one or more processing devices, the computer readable instructions comprising:
    logic configured to receive, from a message server module:
        an attachment item that is conveyed via an original message;
        an indication of a sender and a plurality of recipients associated with the original message; and
        a sender code that is associated with the sender;
    logic configured to store the attachment item;
    logic configured to generate a recipient-specific code for each of the plurality of recipients, wherein each recipient-specific code is an access key that enables each recipient to assess the attachment item, to modify the attachment item, and to store a specific version of the attachment item that corresponds to the recipient-specific code;
    logic configured to associate the sender code and the recipient-specific codes with the attachment item; and
    logic configured to forward the recipient-specific codes to the message server module for association with a plurality of recipient-tailored messages to be sent to the plurality of recipients.

16. The storage device of claim 15, further comprising:
    logic configured to receive a request by at least one of the recipients to access the attachment item in response to activation of the corresponding recipient-specific code; and
    logic configured to enable that recipient to access the attachment item.

17. The storage device of claim 15, further comprising:
    logic configured to receive a request by at least one of the recipients to store a modified version of the attachment item; and
    logic configured to store the modified version of the attachment item.

18. A method comprising:
    receiving an original message from a sender, the original message specifying an attachment item and a plurality of recipients, the original message further being associated with a sender code assigned to the sender;
    generating a plurality of recipient-specific codes, wherein each recipient-specific code corresponding to one of the plurality of recipients specified in the original message from the sender and each recipient-specific code is an access key that enables each recipient to assess the attachment item, to modify the attachment item, and to store a specific version of the attachment item that corresponds to the recipient-specific code; and
    sending a plurality of recipient-tailored messages to the plurality of recipients specified in the original message from the sender, each of the plurality of recipient-tailored messages for each of the plurality of recipients containing content provided by the original message along with the corresponding recipient-specific code.

19. The method of claim 18, further comprising receiving a request by the recipient to forward the recipient-tailored message to another recipient and generating another recipient-specific code associated with the other recipient.

20. The method of claim 19, further comprising sending another recipient-tailored message to the other recipient, the other recipient-tailored message containing content provided by the original message along with the other recipient-specific code.

* * * * *